(No Model.)
F. WESTERBECK.
DIRECT BAIL ATTACHMENT FOR CANS.
No. 512,998. Patented Jan. 16, 1894.
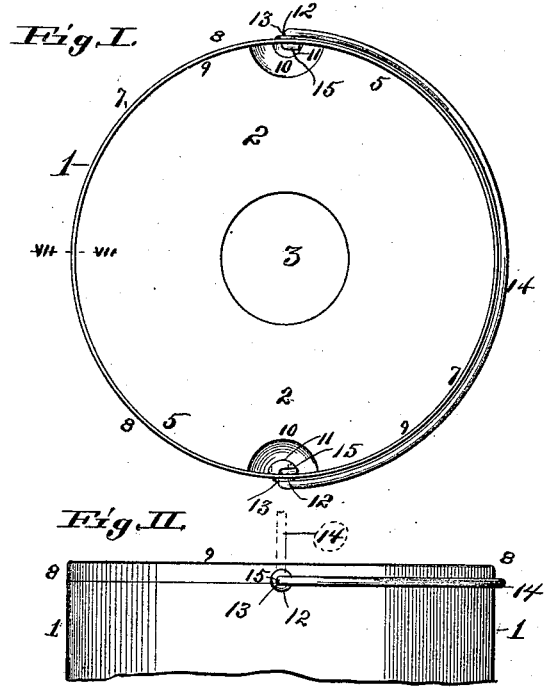
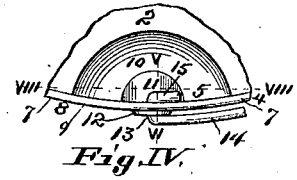
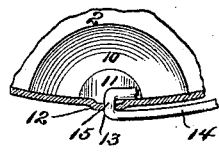
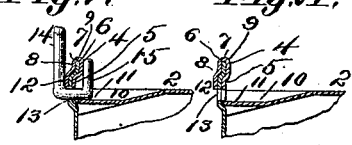
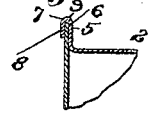
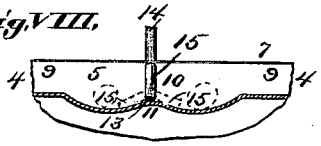
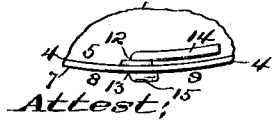
Attest:
Benj. A. Knight
Albert M. Oberdle
Inventor:
Frederick Westerbeck
By Knight Bro's
Attys
THE NATIONAL LITHOGRAPHING COMPANY,
WASHINGTON, D. C.

UNITED STATES PATENT OFFICE.

FREDERICK WESTERBECK, OF ST. LOUIS, MISSOURI.

DIRECT BAIL ATTACHMENT FOR CANS.

SPECIFICATION forming part of Letters Patent No. 512,998, dated January 16, 1894.

Application filed March 13, 1893. Serial No. 465,690. (No model.)

*To all whom it may concern:*

Be it known that I, FREDERICK WESTERBECK, of the city of St. Louis, in the State of Missouri, have invented a certain new and useful Improvement in Direct Bail Attachments for Cans, of which the following is a full, clear, and exact description, reference being had to the accompanying drawings, forming part of this specification.

This invention relates to the direct attachment of bails to cans, without the intervention of ears or lugs, which frequently break off, or become detached and both interfere with and injure other packing with which they come in contact, the top and side rim of the can being joint folded together, and at and adjacent to the points of bail attachment, said top is depressed and the joint fold of the top and rim is flanged outward to provide free room for the insertion and working of the attachment hooks of said bail, and allow the bail, when dropped to lay snugly around the rim of the can, and the attachment hooks to turn without interference with the top; and the invention consists in features of novelty hereinafter fully described and pointed out in the claims.

Figure I is a top view of my lugless can to which the bail is secured by a direct attachment, and shows the stamped depressions of the top, that provide means for said direct attachment of the bail. Fig. II is a detail, side view, and shows the upper portion of the can, with the direct attached bail dropped and at rest; a detail of said bail being shown in broken lines in its elevated position. Fig. III is an enlarged, detail top view, and shows the depression on one side of the top, and the direct bail attachment to the cam rim at that point. Fig. IV is an enlarged, detail, horizontal section intersecting the point of connection of the bail. Figs. V and VI are enlarged, detail, vertical sections, taken on line V—VI, Fig. III, and show respectively the direct bail attachment in the one figure and the depressed and expanded perforate flange seat for the reception of the attachment hook of said bail in the other figure. Fig. VII is an enlarged, vertical section, taken on line VII—VII, Fig. I, and shows the combination joint fold of the top and side rim in the intervening spaces between the bail attachments. Fig. VIII is a vertical section, taken on line VIII—VIII, Fig. III, and shows the depression of the top at and adjacent to the point of attachment of the bail, and also shows the slight upward curve in said depressed line at the immediate point of bail attachment that forms a strengthening brace to said attachment; and Fig. IX is an enlarged, detail top view, and shows a modification in which the bail hook is attached from the inside.

Referring to the drawings:—1 represents the side or body of the can, 2 the top and 3 the filler space in the center of said top.

4 represents the three-fold combination joint rim of the can that is constituted of both the top and side sections, in which the surmounting joint flange 5 of the top, angles upward therefrom on the inside of the surmounting top edge 6 of the side of the can, around the top of which, said joint fold makes a curve turn 7, from which it descends in a margin flange 8, making a three-fold joint. It will be seen that the said three-fold combination joint rim, has a slight elevation as described, above the can-top, which forms a peripheral, surmounting guard 9 above said top and at the same time strengthens the direct bail attachment, that is about to be described.

10 represent two downwardly depressed curvilinear countersinks or depressions at and adjacent to the points of direct bail attachment. The said countersinks may be stamped in the top before its attachment to the body of the can.

11 represent slight cone curves that rise in the center of said countersinks or depressions 10, the apex of which curves are immediately beneath the bail hook attachments at each side of the can, and form a strengthening brace to the same. At the same time the depressed sides of said central cones, allow freedom for the further drop, slightly beyond the place of its connection, of the ends of the attachment hooks, so as not to limit the drop of the bail.

12 represent the two projecting circular flange bosses that are stamped or formed in the surmounting three-fold combination rim joints 4, that connect the top to the side of the can. The said flanges in the preferred form where the bail hooks enter from the outside are stamped so as to project outward, but when said hooks are, as shown in the modification in Fig. IX, attached from the inside, the said flanges are stamped or formed to project inward as is shown in said modified figure. 13 represent the eyelet or perforate bearings within said flanges. 14 represents the bail of the can, the attachment hooks 15 of which are seated in said perforate flange bosses. Now it will be seen that said projecting flange bosses that are stamped or formed at the point of bail connection, brace and strengthen the combination three-fold surmounting rim at said bearing points where there is the greatest stress, and also said projecting bosses either in the preferred form or in the modification serve as buffer stays to hold the bail aloof from the whole balance of said rim in turning, when dropped or elevated.

I claim as my invention—

1. The combination of the body, the top located beneath the upper end of the body, having a flange overlapping the said upper end, and providing an outside marginal flange and the bail having its ends inserted in the upper end of the body and the top flange beneath the marginal flange; substantially as described.

2. The combination of the body, the top located beneath the upper end of the body, having a flange overlapping the said upper end and providing a marginal flange, and the bail; the top-flange and the upper end being formed with perforations beneath the marginal flange for the insertion of the ends of the bail and the upper end of the body and the flanges being formed with strengthening bosses around the bail ends; substantially as described.

3. The combination of the body, the top located beneath the upper end of the body, having strengthening cone-shaped projections, and a flange overlapping the said upper end and providing a marginal flange, and the bail having its ends inserted in the upper end of the body and the top-flange beneath the marginal flange, substantially as described.

4. The combination of the body, the top located beneath the upper end of the body, having depressions, strengthening cone-shaped projections between the depressions and a flange overlapping the said upper end and providing a marginal flange, and the bail having its ends inserted in the upper end of the body and the top-flange from the outside, beneath the marginal flange, and provided with retaining hooks above the cone-shaped projections, the depressions in the top being adapted to receive the hooks; substantially as described.

FREDERICK WESTERBECK.

In presence of—
BENJN. A. KNIGHT,
ALBERT M. EBERSOLE.